United States Patent [19]

Oosterbaan et al.

[11] Patent Number: 4,867,500
[45] Date of Patent: Sep. 19, 1989

[54] VEHICLE ARMREST

[75] Inventors: Douglas J. Oosterbaan; Jon G. Einberger, both of Holland, Mich.

[73] Assignee: Prince Corporation, Holland, Mich.

[21] Appl. No.: 184,957

[22] Filed: Apr. 22, 1988

Related U.S. Application Data

[63] Continuation-in-part of Ser. No. 58,996, Jun. 8, 1987, Pat. No. 4,763,946.

[51] Int. Cl.[4] .................................................. B60J 3/00
[52] U.S. Cl. .................................. 296/97.1; 296/37.8; 297/411
[58] Field of Search .................. 296/97.1, 37.8, 153; 297/411, 412

[56] References Cited

U.S. PATENT DOCUMENTS

| 3,362,749 | 1/1968 | Clement | 297/412 |
|---|---|---|---|
| 3,751,106 | 8/1973 | Mahler et al. | 296/97 |
| 3,827,748 | 8/1974 | Herr et al. | 296/97 |
| 3,844,612 | 10/1974 | Borggren et al. | 297/445 |
| 4,213,493 | 7/1980 | Haworth | 160/351 |
| 4,458,938 | 7/1984 | Viertel et al. | 296/97 |
| 4,570,990 | 2/1986 | Flowerday | 296/97.1 |
| 4,674,790 | 6/1987 | Johnson | 297/411 |

FOREIGN PATENT DOCUMENTS 2117175  10/1972  Fed. Rep. of Germany .

Primary Examiner—Robert R. Song
Attorney, Agent, or Firm—Price, Heneveld, Cooper et al.

[57] ABSTRACT

A vehicle accessory includes a body form comprising a core having two halves joined along a common edge and which are folded and snap-fitted together. The core is covered by an upholstery material captively held by a channel in the core which includes inner and outer walls having a floor with an opening for receiving tabs of the upholstery material. One of the walls is slotted at intervals, in the preferred embodiment, to define a resilient section which compressibly grips the tab of the upholstery material once inserted.

20 Claims, 2 Drawing Sheets

VEHICLE ARMREST

This present application is a continuation-part-application of pending application No. 07/058,996 filed June 8, 1987, now U.S. Pat. No. 4,763,946, and entitled VISOR. The subject matter of this prior application is incorporated herein by reference.

BACKGROUND OF THE INVENTION

The present invention relates to the construction of a vehicle accessory and particularly to an armrest.

Accessories for vehicles and particularly visors such as disclosed in U.S. Pat. No. 3,926,470 have been manufactured using a clamshell-type folded polymeric core made of a suitable material such as polypropylene. There is a variety of manners in which to upholster and hold such core halves together including interlocking arms, rivets and the like. Also, core halves for visors have been held together employing heat fusion or through an adhesive material as disclosed in U.S. Pat. Nos. 4,570,990, 4,458,938 also discloses a snap-together visor employing a foam core having a wire frame and one or more braces with snap together pins and holes. The visor cover is wrapped around the core halves and extends between them.

Although newer clamshell-type vehicle accessories such as visors have an improved appearance by removing the edge bead and providing a folded core with cores of sufficiently rigid construction, the manufacture of such articles can be somewhat expensive due to the attachment of upholstery material to the core and the subsequent process of bonding of the core halves together.

SUMMARY OF THE PRESENT INVENTION

A vehicle accessory, and particularly an armrest of the present invention, overcomes the deficiency of the prior art by providing a body form comprising an armrest core having two halves joined along a common edge and which are folded and snap-fitted together. The core is covered by an upholstery material and includes an open recess for receiving pivot means mounting the armrest to a vehicle. The upholstery material surrounding the open recess is captively held by the core which includes inner and outer walls defining a channel therebetween having a floor with an opening for receiving tabs of the upholstery material. One of the walls is slotted at intervals, in the preferred embodiment, to define a resilient section which compressibly grips the tab of the upholstery material once inserted.

Thus, the present invention contemplates the economical and improved construction of a vehicle accessory such as an armrest including folded core halves which are snap-fitted together and a method and apparatus for securing upholstery to the core. These and other features, objects and advantages of the present invention will become apparent upon reading the following description thereof together with reference to the accompanying drawings in which:

DETAILED DESCRIPTION OF THE PREFERRED EMBODIMENT

Figure 1:
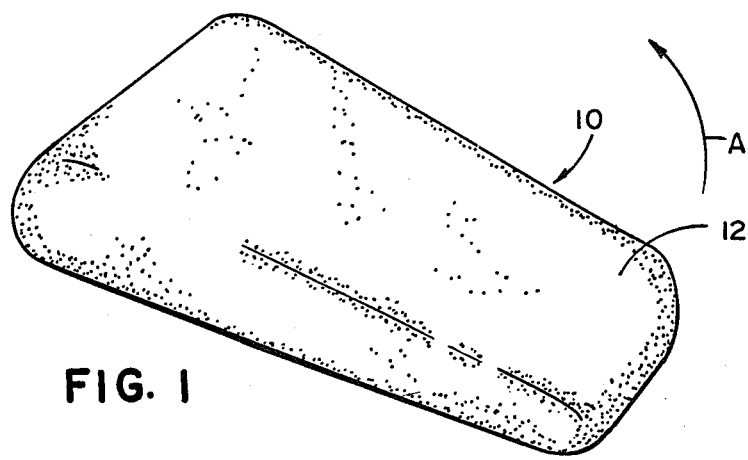
FIG. 1 is a top perspective view of an armrest embodying the present invention.
Figure 2:
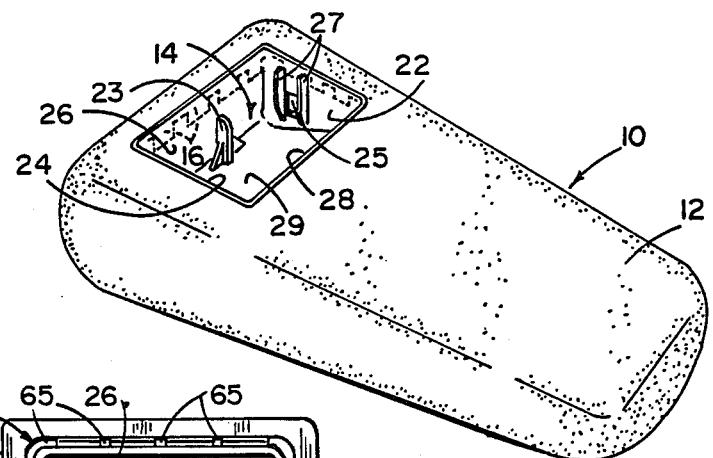
FIG. 2 is a bottom perspective view of the armrest shown in FIG. 1.

Referring initially to FIGS. 1 and 2 there is shown a vehicle armrest 10 which in the preferred embodiment is adapted to be mounted between the front seats of a split seat for material 12 which is sewn together in panels in the form of a fitted sock with an opening 18 (FIG. 7) which is extended over a body form comprising core 20 (FIG. 3) defining the body and shape of the armrest 10.

Figure 3:
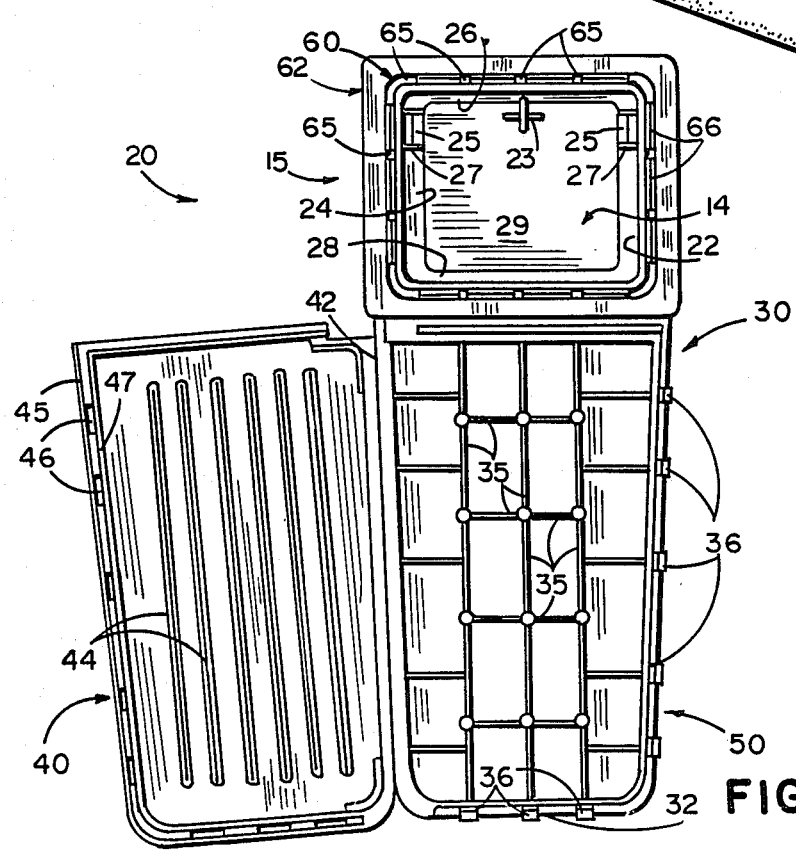
FIG. 3 is a bottom plan view of the core construction for the armrest shown in FIGS. 1 and 2.
Figure 5:
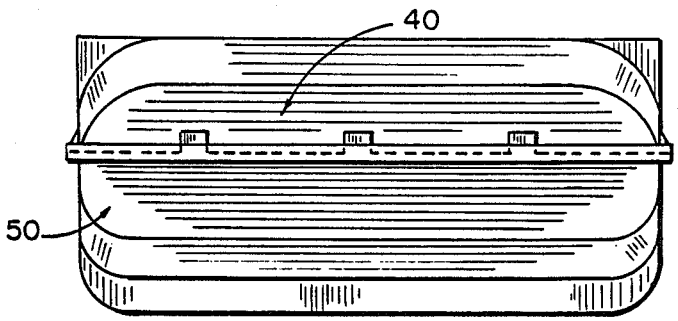
FIG. 5 is a front elevational view of the armrest core shown in its closed position.

The armrest 10 includes a mounting member 15 with a recess 14 integrally formed within the core 20 on its lower surface such that the pivot mechanism mounted between the vehicle seats, including a pivot axle, can be coupled to the armrest 10 for pivoting the armrest between the lowered use position, as illustrated in FIG. 1, and raised in an arc indicated by arrow A in FIG. 1 to a stored position. Recess 14 is defined by inwardly tapered sidewalls 22 and 24, a rear wall 26 and a front wall 28 integrally formed with a floor 29 which is inclined from front-to-back, as best seen in FIG. 2. Sidewalls 22 and 24 each include an aperture 25 formed therethrough for receiving a pivot axle which is guidably fitted within the apertures 25. A pair of spaced guide flanges 27 extend vertically along each of the walls 22 and 24, as best seen in FIGS. 2 and 3, and guide the installation of the armrest onto the pivot axle (not shown). A reenforcing ridge 23 extends between floor 29 and rear wall 26 to add rigidity to the structure.

Figure 4:
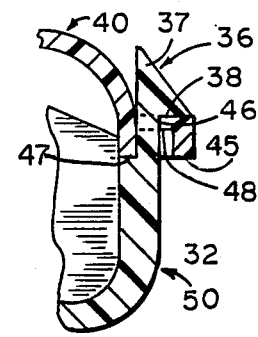
FIG. 4 is an enlarged fragmentary cross-sectional view of the interlocking connection of the core halves.

A forward section 30 of armrest 10 is integrally molded and coupled to the cup-shaped mounting member 15 and includes a lower concave core section 40 pivotally joined along an edge 42 to an upper concave core section 50. The interior cavity of upper section 50 includes a plurality of interconnected orthogonal walls 35 for adding rigidity to the body of the armrest. The integrally molded polymeric core 20 includes an integral polymeric hinge 42 connecting the common edge-=of sections 40 and 50. The inner surface of the bottom section 40 includes a plurality of longitudinally extending ribs 44 adding additional rigidity to the armrest structure. Section 40 is snap-fitted and interlocked to section 50 of the forward portion 30 of core 20 by means of the interlocking mechanism, best shown in FIG. 4. In FIG. 4, the side 32 of inverted upper section 50 is shown and includes a plurality of upwardly and outwardly projecting tabs 36. A plurality of such tabs 36 are formed along the reverse L-shaped rim of core section 50, as best seen in FIG. 3. Each tab includes an inclined ramping surface 37 and horizontally extending locking flange 38. Tabs 36 extend between a pair of spaced lips, or ridges 45 and 47, extending in spaced parallel relationship around the periphery of section 40. Spaced slots 46 are formed in the longitudinally extending floor extending between ridges 45 and 47 to receive tabs 36. The pointed tip of each of the resilient tabs 36 are thereby guided into place between the ridges 45 and 47 and into slots 46 at the bottom of the channel so defined. Such construction therefore positively locks the core members together to define the overall shape of the armrest 10.

Figure 8:
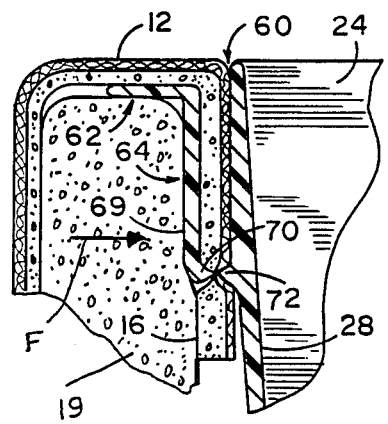
FIG. 8 is a fragmentary cross-sectional view taken along section Lines VIII—VIII of FIG. 6 with the addition of the armrest material and showing the insertion of the upholstery within the armrest core.
Figure 9:
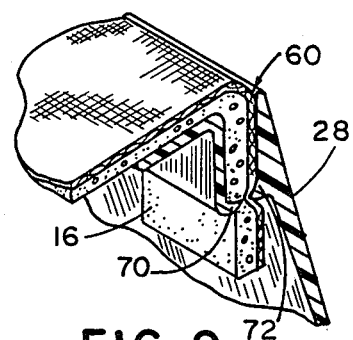
FIG. 9 is an enlarged, fragmentary perspective view of a portion of the structure shown in FIG. 8.

The upholstery material 12 is sewn into the form of a sock and is then extended over core 20 through the opening 18 in the stretchable fabric. The edges of the fabric 12 are then lockably inserted into an upholstery receiving channel 60 surrounding the recess 14 formed in the core 20, as best seen in FIGS. 8 and 9. Channel 60 is defined by the walls 22, 24, 26 and 28 on the inner surface and by an integral outer peripheral L-shaped flange 62 integrally molded to and extending in parallel spaced relationship to walls 22, 24, 26 and 28. A horizontally extending floor 65 joins flange 62 to the mounting member 15.

Figure 6:
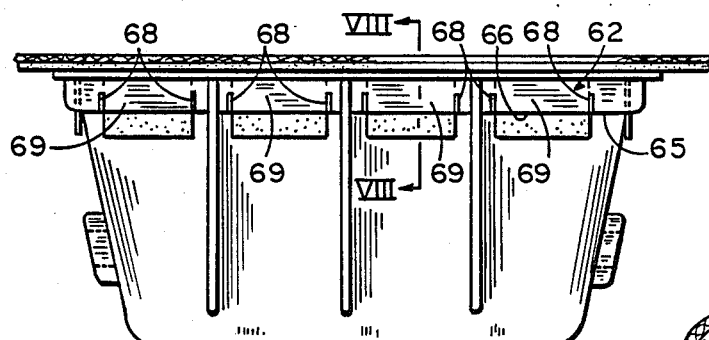
FIG. 6 is a rear elevational view of the armrest core and showing the upholstery material in cross section.

Between the interconnecting floor section 65 coupling the inverted L-shaped flange 62 including sidewall 64 to the walls of recess 14 are a plurality of tab receiving slots 66 which are formed during the molding process by flat rectangular mold inserts spaced along the floor of the channel 60. Further, extending upwardly on either side of each of the slots 66 and extending through sidewall 64, as best seen in FIG. 6, are vertical slots 68 which provide resiliency for the side 64 and the area between the slots 68 so formed to define in effect outer flap 69 along wall 62 adjacent each of the bottom slots 66.

Figure 7:
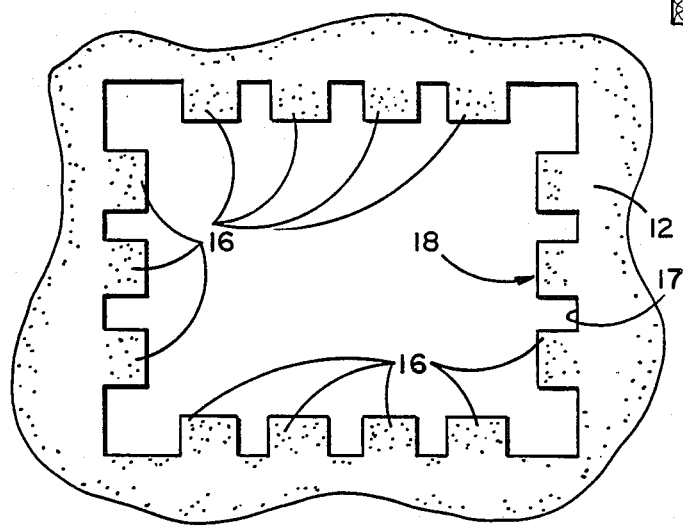
FIG. 7 is a fragmentary plan view of the opening in the upholstery and the edge for insertion into the visor core as illustrated in FIGS. 2 and 6.

The upholstery material 12 is cut in a pattern, as best seen in FIG. 7, to include a plurality of generally rectangular tabs 16 extending inwardly toward the central opening 18. As best seen in FIG. 8, the armrest includes a foam body 19 surrounding core 20 which is covered by the upholstery material 12. Material 12 is a foam-backed fabric which can be pushed downwardly with a rectangular fixture having a plurality of flat rectangular fingers with a cross-sectional area and location pattern corresponding to the slots 66 in the floor 65 of channel 60 such that when lowered, the tabs 16 of the upholstery material 12 are forced downwardly through the slots 66, deflecting flaps 69 slightly against foam material 19 to allow the material to extend through slots 66 as seen in FIGS. 8 and 9. As the pushing fingers of the assembly fixture are withdrawn, the resilient polymeric flaps 69 are forced back to essentially close the peripheral edges 70 and 72 of the slots 68 together, as best seen in FIGS. 8 and 9, crimping the upholstery fabric therebetween and holding it within channel 60. The resilient polymeric flaps 69 on walls 22, 24, 26 and 28 are forced to the closed position by the pressure applied by the compressed foam 19 against flaps 69. The material 12, which is stretched tightly over the core 20 and foam body 19, also increases the force F (FIG. 8) executed against flaps 69 by foam body 19. The pushing fingers will push the tabs 16 downwardly until the edges 17 (FIG. 7) of the upholstery material seat against the floor 65 of channel 60 thereby fully inserting the tabs 16 into the slots 66 or the material is stretched taut. The result is a secure and neat appearing attachment of the upholstery material around the core recess 14, as best seen in FIG. 2.

Thus, the vehicle accessory of the present invention contemplates the provision of a body form for a vehicle accessory, which in the preferred embodiment is a polymeric core member, with core halves snap-fitted together and interlocked to define a body shape which can be upholstered. The upholstery is trim-fitted to an edge of the core member by channel means having apertures in the floor and resilient tabs adjacent each aperture for . selectively gripping tabs extending from the edge of the upholstery for completing the upholstered article. The core can be molded of any suitable polymeric material such as polypropylene.

It will become apparent to those skilled in the art that various modifications to the preferred embodiment of the invention can be made without departing from the spirit or scope thereof as defined in the appended claims.

The embodiments of the invention in which an exclusive property or privilege is claimed are defined as follows:

1. A core construction for a vehicle accessory such as an armrest, visor or the like, said core comprising:
   first and second integrally molded mating sections joined along a common edge by hinge means, wherein one of said sections includes a plurality of tabs projecting outwardly therefrom and the other of said sections includes slot means for captively receiving said tabs, and wherein said other section further includes wall means extending outwardly from opposite sides of said slot means to urge said tabs into locking engagement with said slot means for assisting in joining and holding said core sections together.

2. The apparatus defined in claim 1 wherein said tabs have a projecting end each of which lockably engages an edge of the slot means into which the tab extends.

3. The apparatus as defined in claim 2 wherein said slot means is formed in a floor extending between said wall means.

4. The apparatus as defined in claim 3 wherein said core is integrally molded of a resilient polymeric material and said hinge means integrally joins said sections.

5. The apparatus as defined in claim 4 wherein said projecting end of said tabs have a width greater than the width of said slot means and resiliently deforms for insertion into said slot means.

6. The apparatus as defined in claim 5 wherein said projecting ends of said tabs have an inclined leading edge to facilitate their insertions between said wall means and into said slot means.

7. The apparatus as defined in claim 6 wherein said wall means includes a pair of substantially continuous parallel spaced walls defining a channel therebetween and extending around a peripheral portion of said other section and wherein said tab means are formed on a peripheral additional wall of said one section, which mates with said channel.

8. The apparatus as defined in claim 7 wherein said polymeric material is a polypropylene.

9. The apparatus as defined in claim 8 wherein said one and other sections define an armrest shape.

10. The apparatus as defined in claim 1 wherein said core includes a channel for receiving and holding an edge of upholstery material covering said core, wherein said edge includes at least one tab extending outwardly therefrom and wherein said channel includes a resilient slot formed therein to compressibly hold said tab once inserted into said slot.

11. The apparatus as defined in claim 10 wherein said resilient slot is defined by a flap formed in the side of said channel.

12. The apparatus as defined in claim 11 wherein said channel defines a closed geometric shape and includes a plurality of spaced resilient slots formed therein and wherein said upholstery material includes a plurality of tabs aligned with said resilient slots.

13. A vehicle accessory including an upholstery covering; said accessory comprising:
- a form over which upholstery material is applied, said form including a channel defined by a pair of spaced parallel walls, said channel receiving and holding an edge of the upholstery material wherein said edge includes at least one tab extending outwardly therefrom and wherein one wall of said channel includes a slot formed therein to provide a tab receiving opening, and an opposite wall includes means aligned with said slot for compressibly engaging said tab when inserted into said slot for holding said edge of said upholstery material in said channel.

14. A vehicle accessory including an upholstery covering, said accessory comprising:
- a form over which upholstery material is applied, said form: including a channel for receiving and holding an edge of the upholstery material wherein said edge includes at least one tab extending outwardly therefrom and wherein said channel includes slot means formed therein and a resilient flap tending to close said slot for compressibly engaging said tab when inserted into said slot means for holding said edge of said upholstery material in said channel.

15. A vehicle accessory including an upholstery covering, said accessory comprising:
- a form over which upholstery material is applied, said form including a channel for receiving and holding an edge of the upholstery material wherein said edge includes at least one tab extending outwardly therefrom and wherein said channel includes resilient slot means formed therein for compressibly engaging said tab when inserted into said slot means for holding said edge of said upholstery material in said channel, wherein said resilient slot is defined by a flap formed in the side of said channel.

16. The apparatus as defined in claim 15 wherein said channel defines a closed geometric shape and includes a plurality of spaced resilient slots formed therein and wherein said upholstery material includes a plurality of tabs aligned with said resilient slots.

17. The apparatus as defined in claim 16 wherein said form is integrally molded of a resilient polymeric material.

18. A construction for a vehicle accessory such as an armrest, visor or the like comprising:
- a core defined by first and second integrally molded mating sections joined along a common edge by hinge means, wherein one of said sections includes a plurality of peripheral spaced tabs projecting outwardly therefrom and the other of said sections includes peripheral spaced slot means for captively receiving said tabs, and wherein said other section further includes wall means extending outwardly from opposite sides of said slot means to urge said tabs into locking engagement with said slot means for assisting in joining and holding said core sections together; and
- an upholstery covering for said core, wherein said core includes a channel for receiving and holding an edge of the upholstery material wherein said edge includes at least one upholstery tab extending outwardly therefrom and wherein said channel includes an upholstery slot formed therein to provide an upholstery tab receiving opening and means for compressibly engaging said upholstery tab when inserted into said slot for holding said edge of said upholstery material in said channel.

19. The apparatus as defined in claim 18 wherein said means for compressibly engaging said upholstery tab comprises a resilient flap positioned adjacent said opening and tending to close said opening.

20. The apparatus as defined in claim 19 wherein said core is integrally molded of a resilient polymeric material.

* * * * *

UNITED STATES PATENT AND TRADEMARK OFFICE
CERTIFICATE OF CORRECTION

PATENT NO. : 4,867,500

DATED : September 19, 1989

INVENTOR(S) : Douglas J. Oosterbaan, et al.

It is certified that error appears in the above-identified patent and that said Letters Patent is hereby corrected as shown below:

Column 1, Line 4
Delete "continuation-part-" insert therefor
--continuation-in-part--

Column 1, Line 5
After second occurrence of "application"
insert --Serial--

Column 1, Line 22
Delete "Nos. 4,570,990, 4,458,938" insert
--No. 4,570,990. U. S. Patent No. 4,458,938--

Column 2, Line 22
After "for" insert --a vehicle. Armrest 10 is
covered by a suitable upholstery--

Column 2, Line 54
Delete "edge-=" and insert --edges--

Column 4, Line 7
After "for" delete "."

UNITED STATES PATENT AND TRADEMARK OFFICE
CERTIFICATE OF CORRECTION

PATENT NO. : 4,867,500

DATED : September 19, 1989

INVENTOR(S) : Douglas J. Oosterbaan, et al.

It is certified that error appears in the above-identified patent and that said Letters Patent is hereby corrected as shown below:

Column 5, Line 26
    After "form" delete ":"

Signed and Sealed this

Twelfth Day of November, 1991

Attest:

HARRY F. MANBECK, JR.

*Attesting Officer*        *Commissioner of Patents and Trademarks*